United States Patent
Leung

(10) Patent No.: US 12,316,133 B1
(45) Date of Patent: May 27, 2025

(54) SYSTEM FOR WIRELESS POWER DELIVERY

(71) Applicant: Greenbulb Trading Limited, Hong Kong (HK)

(72) Inventor: Elton Yu Man Leung, Hong Kong (HK)

(73) Assignee: Greenbulb Trading Limited, Hong Kong (HK)

( * ) Notice: Subject to any disclaimer, the term of this patent is extended or adjusted under 35 U.S.C. 154(b) by 10 days.

(21) Appl. No.: 18/392,769

(22) Filed: Jan. 10, 2024

(51) Int. Cl.
*H02J 50/10* (2016.01)
*H02J 50/00* (2016.01)
*H02J 50/80* (2016.01)
*H02J 50/90* (2016.01)

(52) U.S. Cl.
CPC ............ *H02J 50/10* (2016.02); *H02J 50/005* (2020.01); *H02J 50/80* (2016.02); *H02J 50/90* (2016.02)

(58) Field of Classification Search
CPC .. H02J 50/10; H02J 50/80; H02J 50/90; H02J 50/005
USPC ........................................................ 307/104
See application file for complete search history.

(56) References Cited

U.S. PATENT DOCUMENTS

| | | | |
|---|---|---|---|
| 10,343,535 B2 * | 7/2019 | Cook | B60L 53/38 |
| 2012/0274271 A1 * | 11/2012 | Thompson | A61B 5/686 |
| | | | 320/108 |
| 2019/0074706 A1 * | 3/2019 | Wittenberg | H02J 50/90 |
| 2019/0074724 A1 * | 3/2019 | Wittenberg | H01F 27/288 |
| 2019/0123598 A1 * | 4/2019 | Patmore | A61G 7/05 |
| 2024/0055899 A1 | 2/2024 | Draak et al. | |

FOREIGN PATENT DOCUMENTS

WO    2024/030614 A1    2/2024

* cited by examiner

*Primary Examiner* — Alfonso Perez Borroto
(74) *Attorney, Agent, or Firm* — Melvin Li

(57) ABSTRACT

The present invention is concerned with a system for wireless power transfer from one side of a transparent or translucent panel to the opposite side thereof. The system has an emitter unit on the one side of the panel and provided with a primary wire coil for receiving an AC such that the primary wire coil emanates a magnetic field and a receiver unit on the opposite side of the panel and provided with a secondary coil which when subjected to the magnetic field produces an AC. The system has a positioning system provided with a guide on either the emitter unit or the receiver unit and a positioner on the other respective unit whereby when a user is installing the system the user can use the positioner to check a position of the guide across the panel and align the emitter unit and the receiver unit.

20 Claims, 14 Drawing Sheets

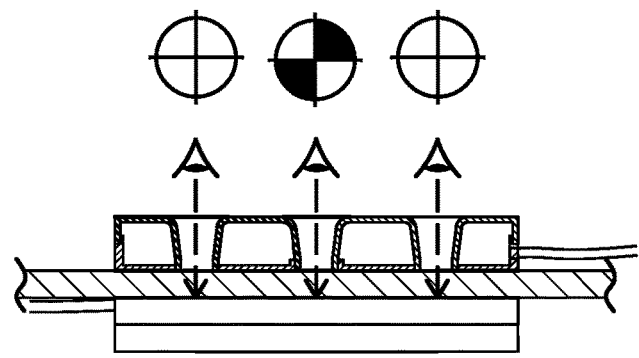
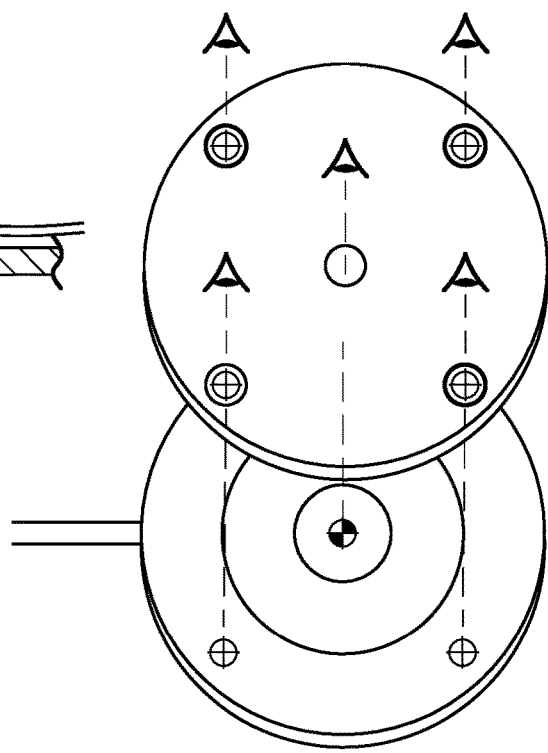
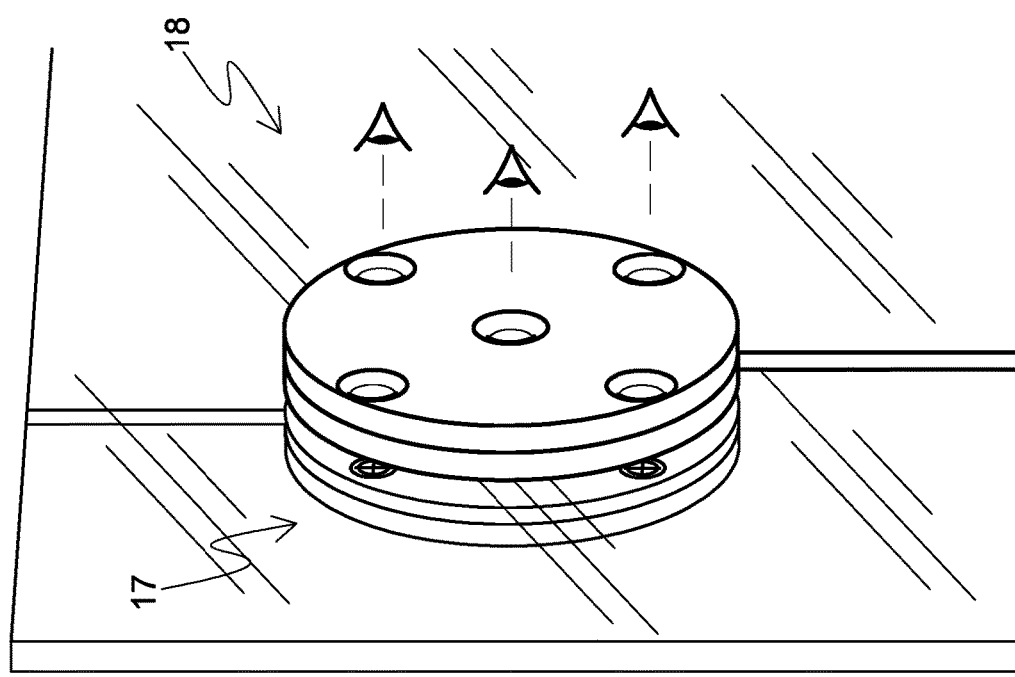
Fig. 9b
Fig. 9c
Fig. 9a

SYSTEM FOR WIRELESS POWER DELIVERY

TECHNICAL FIELD OF THE INVENTION

The present invention is concerned with a system for transferring power wirelessly. Certain aspects of the invention, for example, are specifically concerned with systems of transferring power wirelessly across a glass window panel or a dividing barrier or panel of a dwelling and/or systems of facilitating installation thereof.

BACKGROUND OF THE INVENTION

There are different specialty appliances for use in connection with a premises. For example, in typical dwellings, many users would install various appliances such as doorbells, surveillance cameras, flood lights, pest repellers, lighting systems, security alarms, etc. on or at the exterior of the premises. These appliances often require electrical power to operate. To address the need of a power supply, some of these appliances are designed to be powered by DC batteries. Nevertheless, battery power is not a reliable power source because they often do not last for a long period of time. When the power from a battery is exhausted, the appliance will cease to operate. Batteries also tend to deteriorate relatively quickly in an outdoor environment. This can be inconvenient and in the case of a surveillance alarm, for example, a non-operating security system pose a security risk to the tenants of the dwelling.

To address the need of providing a constant power supply without relying on DC batteries, there have been proposals to make use of a solar power system to generate and supply power to such an appliance. While the use of solar power systems may provide electrical power at a lower cost, they are often limited in many situations. For example, solar power systems are not operable in a shaded area or in a location with inadequate sunlight. Further, a reliable solar system requires a solar panel with a sufficiently large size but the circumstances of the location of the dwelling may not allow the installation of such a sufficiently large solar panel.

Another way to address the need of a constant power supply without relying on DC batteries or solar systems is to install an electrical outlet at the exterior location of the dwelling where the appliance is to be installed. However, this is often complicated or not practical because if/when multiple appliances along the periphery are to be installed on the periphery or various exterior locations of the dwelling the cost and complications to engage an electrician to perform the relevant electrical work is prohibiting.

Conceivably, another way to address the need to provide a constant power supply without relying on DC batteries or solar systems or engaging an electrician to install extensive outdoor electrical AC sockets is for a lay tenant of the dwelling to drill holes or mechanically open passageways at various locations of the wall of the dwelling and install an electrical extension cord from a nearby indoor electrical socket to the outdoor location through the drilled holes. However, this approach may be far from a realistic or reasonable solution. It is partly because drilling holes or opening up passageways in a wall of a dwelling can cause unintended complications, e.g. interfering installations in the wall which is likely beyond what a lay user is capable of. Further, causally carrying out such modification works may not be in compliance with building codes/regulations.

The present invention seeks to address the above issues, or at least to provide an alternative to the public.

BRIEF DESCRIPTION OF THE INVENTION

According to a first aspect of the present invention, there is provided a system for wireless power transfer from one side of a transparent or translucent panel to the opposite side of the panel, comprising i) an emitter unit installable on the one side of the panel, wherein the emitter unit includes a primary wire coil for receiving an alternating current such that the primary wire coil emanates a magnetic field and ii) a receiver unit installable on the opposite side of the panel, wherein the receiver unit includes a secondary wire coil which when subjected to the magnetic field from the primary wire coil generates an alternating current, wherein the emitter unit is provided with a first electrical cable connectable to an electrical outlet at one end thus receiving an alternating current from the electrical outlet, and the receiver unit includes a second converter for converting the alternating current generated from the secondary coil to a direct current for supply to an appliance installable or installed adjacent to the receiver unit, and wherein the system comprises a positioning system provided with a guide on either the emitter unit or the receiver unit and a positioner on the other respective unit whereby when a user is installing the system the user can use the positioner to check a position of the guide across the panel and align the emitter unit and the receiver unit for maximum exposure to the magnetic field by the secondary wire coil.

Preferably, the panel may be planar and non-metallic, and/or the panel may have a thickness up to 40 mm, preferably up to 30 mm, and more preferably up to 20 mm.

Suitably, the system may comprise a transformer for stepping down a voltage of the alternating current of 110V-240V incoming from the electrical outlet to 5V-24V thus producing a voltage stepped-down alternating current for supply to the primary coil, wherein the transformer may reside in the one end of the electrical cable. The system may comprise a first converter for stepping up a frequency of the alternating current of 50 Hz-60 Hz incoming from the electrical outlet to 50 kHz-300 kHz thus producing a frequency stepped-up electrical current for supply to the primary coil. In one embodiment, the stepped-up frequency may be 105 kHz-210 kHz. The exact stepped-up frequency depends on the requirements of the appliance receiving the alternating current.

Advantageously, the system may comprise a controller limiting an output voltage and an output current of the emitter unit up to 24V and 1000 mA, respectively, to the primary coil. The controller may be configured to allow a two-way communication between the emitter unit and the receiver unit for controlling a predetermined maximum magnetic field output by the primary coil.

In an embodiment, the guide may be marking on the receiver unit secured to one side of the panel and the positioner is an opening provided on the emitter unit whereby matching the opening to the marking allows alignment of the emitter unit and the receiver unit, and the opening may be provided at the center on the emitter unit surrounded by the primary wire coil. In one specific embodiment, the marking may be provided at the center of the receiver unit surrounded by the secondary wire coil.

In one embodiment, the guide may be a first projection extending from the receiver unit and the positioner may be a second projection extending from the emitter unit, and wherein the first protection and the second projection may share the same profile.

In an alternative embodiment, the guide may be a marking defining a shape provided on the emitter unit and the positioner may be a boundary of the receiver unit defining the same shape.

In another alternative embodiment, the guide may be a boundary of the emitter unit defining a profile and the positioner may be a boundary of the receiver defining the same profile.

In yet another alternative embodiment, the guide may be a boundary of the receiver unit defining a first geometry and the positioner may be a boundary of the emitter unit defining a second geometry smaller than the first geometry.

According to a second aspect of the present invention, there is provided an electrical appliance system, comprising a power transfer system as described above and an electrical appliance, wherein the electrical appliance is selected from a group including an outdoor camera, a security light or an illumination lighting.

According to a third aspect of the present invention, there is provided a system for wireless power transfer from one side of a non-metallic panel to the opposite side of the panel, comprising or wherein i) a transformer for stepping down a voltage of an alternating current of 110V to 240V incoming from an electrical outlet of a premises to 5V to 24V thus producing a voltage stepped-down alternating current, ii) an emitter unit installable on the one side of the panel, wherein the emitter unit is provided with a first converter for frequency stepping up the voltage of 50 Hz-60 Hz to 50 kHz-300 kHz thus producing a frequency stepped up alternating current, iii) the emitter unit is provided with a primary coil for receiving the voltage stepped down and the frequency stepped up alternating current of 5V-24V and 50 kHz-300 kHz thus generating a magnetic field, iv) a receiver unit installable on the opposite side of the panel, wherein the receiver unit includes a secondary coil which when subjected to the magnetic field generates an alternating current, v) a second converter for converting the alternative current generated in the secondary to a direct current, for supply to an appliance installable or installed adjacent to the receiver unit, and vi) the emitter unit and the receiver unit, when in use, are separated by the panel having a thickness or a clearance up 40 mm, preferably up to 30 mm, and more preferably up to 20 mm.

Preferably, the system may comprise a controller limiting an output voltage and an output current of the emitter unit up to 24V and 1000 mA, respectively, wherein the controller is configured to allow two-way communication between the emitter unit and the receiver unit for controlling a predetermined maximum magnetic field output by the primary coil, and wherein the receiver unit is configured to output a voltage of up to 24V.

Suitably, the system may comprise a positioning system provided with a guide on either on the emitter unit or the receiver unit and a positioner on the other respective unit whereby when a user is installing the system the user can use the positioner to check a position of the guide across the panel and locate and align the emitter unit and the receiver unit for maximum exposure to the magnetic field by the receiver unit, the guide is a marking on the receiver unit secured to one side of the panel and the positioner is an opening provided on the emitter unit whereby matching the opening to the marking allows alignment of the emitter unit and the receiver unit, and the opening is provided at the center on the emitter unit surrounded by the primary wire coil and the marking is provided at the center of the receiver unit surrounded by the secondary wire coil.

Advantageously, the guide may be a first projection extending from the receiver unit and the positioner may be a second protection extending from the emitter unit, and wherein the first protection and the second projection may share the same profile.

In an embodiment, the guide may be a marking defining a shape provided on the emitter unit and the positioner is a boundary of the receiver unit defining the same shape.

In one embodiment, the guide may be a boundary of the emitter unit defining a profile and the positioner is a boundary of the receiver defining the same profile.

In an alternative embodiment, the guide may be a boundary of the receiver unit defining a first geometry and the positioner is a boundary of the emitter unit defining a second geometry small/than the first geometry.

BRIEF DESCRIPTION OF DRAWINGS

FIG. 3 is an enlarged view of the indoor environment of FIG. 2a;

FIG. 4b is an enlarged view of the indoor environment of FIG. 2a and illustrates the embodiment of FIG. 4a;

FIGS. 9a, 9b and 9c are additional schematic views showing an installation of the first embodiment of the power transfer system of FIGS. 4a and 4b;

DETAILED DESCRIPTION OF PREFERRED EMBODIMENTS OF THE INVENTON

The present invention is broadly concerned with a system for transferring electrical power wirelessly across a barrier (e.g. a planar panel such as a glass panel) or clearance. For example, the power may be transferred wirelessly from one side of a window of a dwelling to the other side of the window across a glass panel of the window. In another scenario, the barrier (typically planar) may be of a non-metallic material, e.g. a ceramic panel, a drywall panel, a wood panel, a cardboard panel, or a double pane panel with a vacuum or air spacing therebetween.

Figure 1:
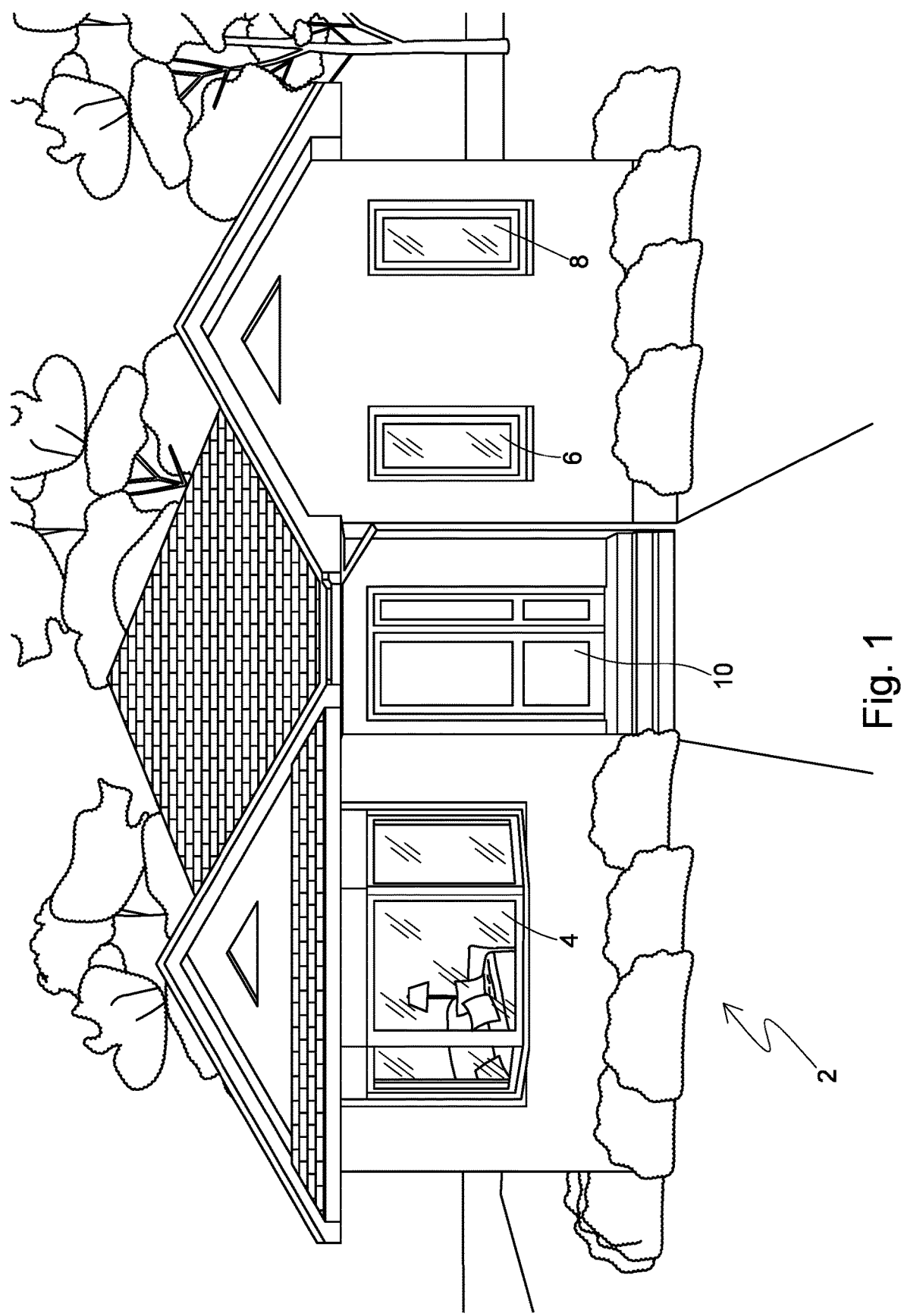
FIG. 1 is a diagram showing a dwelling with an exterior providing walls and windows at which a first embodiment of a power transfer system according to the present invention can install.

By way of an example, FIG. 1 illustrates a dwelling of a premises. The dwelling is in the form of a common residential house. FIG. 1 is a view showing the front of the house 2. The front of the house 2 is provided with a number of windows 4, 6, 8 including a main window 4 of a living room and a front door 10. In this example, the windows are provided with transparent glass panels 4a.

Figure 2A:
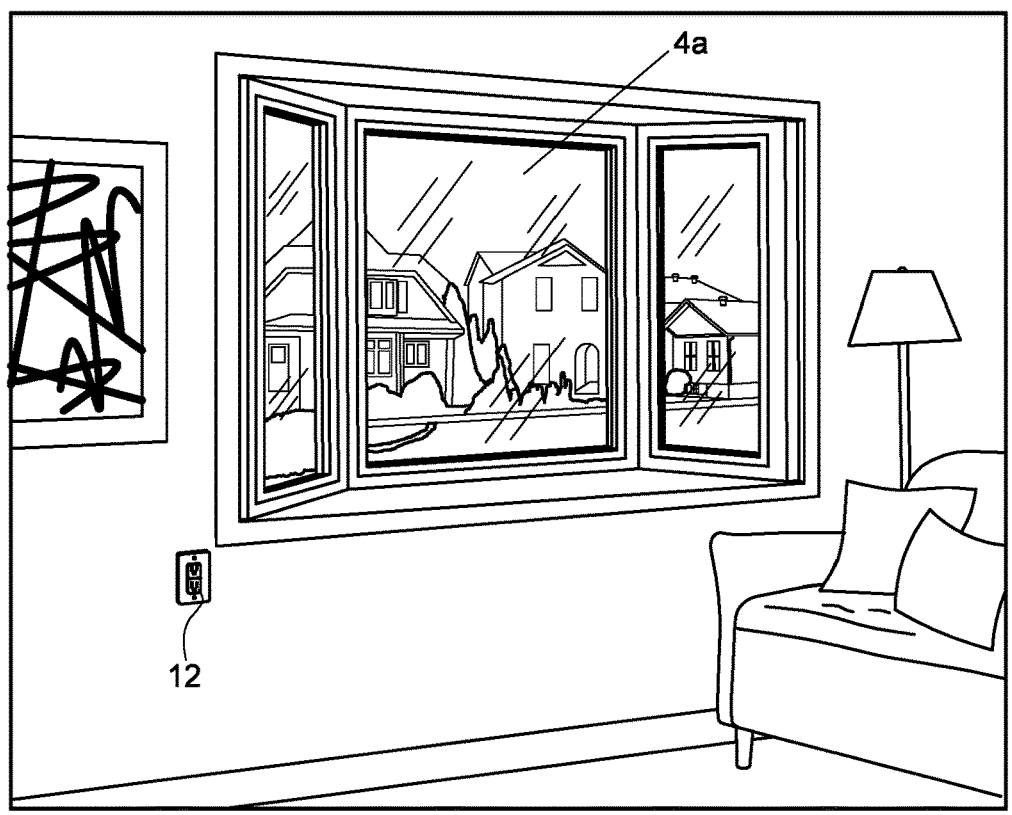
FIG. 2a and FIG. 2b are views from the indoor and outdoor environments of the dwelling of FIG. 1, respectively.
Figure 2B:
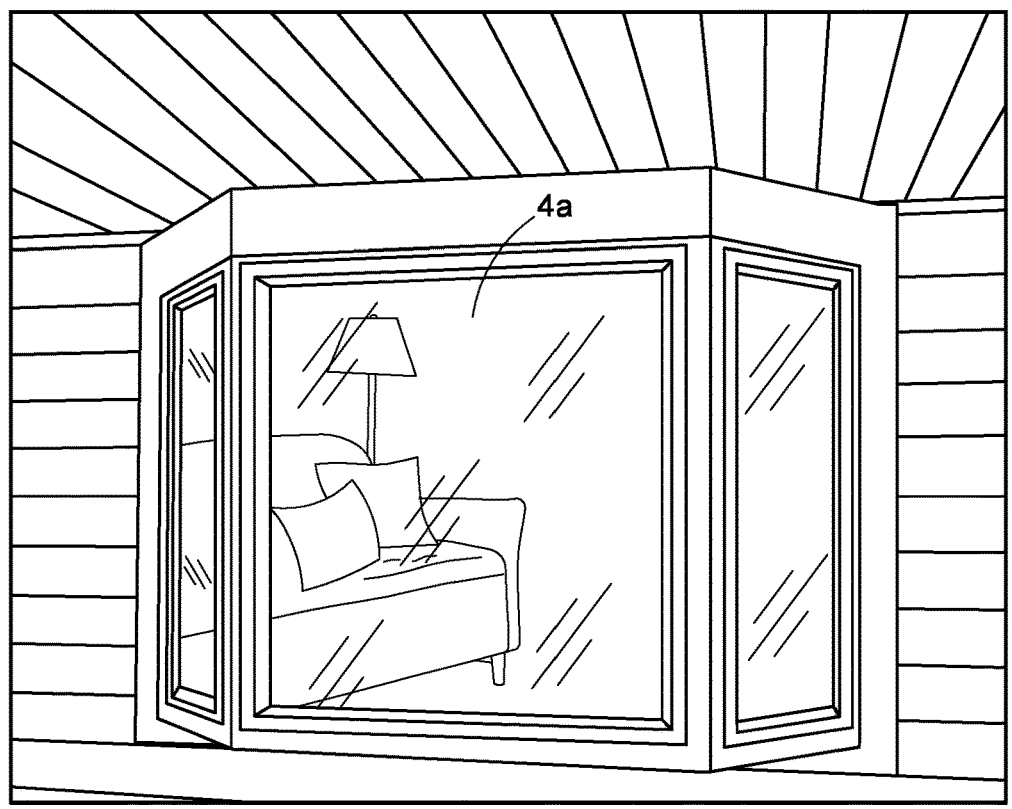

FIG. 2a and FIG. 2b illustrate the interior and exterior of a living room of the dwelling, respectively. Specifically, FIG. 2a is a view of the living room showing the main window 4 looking out to a front area of the house 2 and other houses across the street. FIG. 2a shows that the living room is provided with an electrical outlet 12 (~110V or ~240V) at a lower left corner of a wall at which the main window 4 is located. FIG. 2b corresponds to FIG. 1 although it is a close-up view showing the main window 4. From FIGS. 1 and 2b, it can be seen that no electrical outlets are provided on the exterior front of the house 2.

Figure 3:
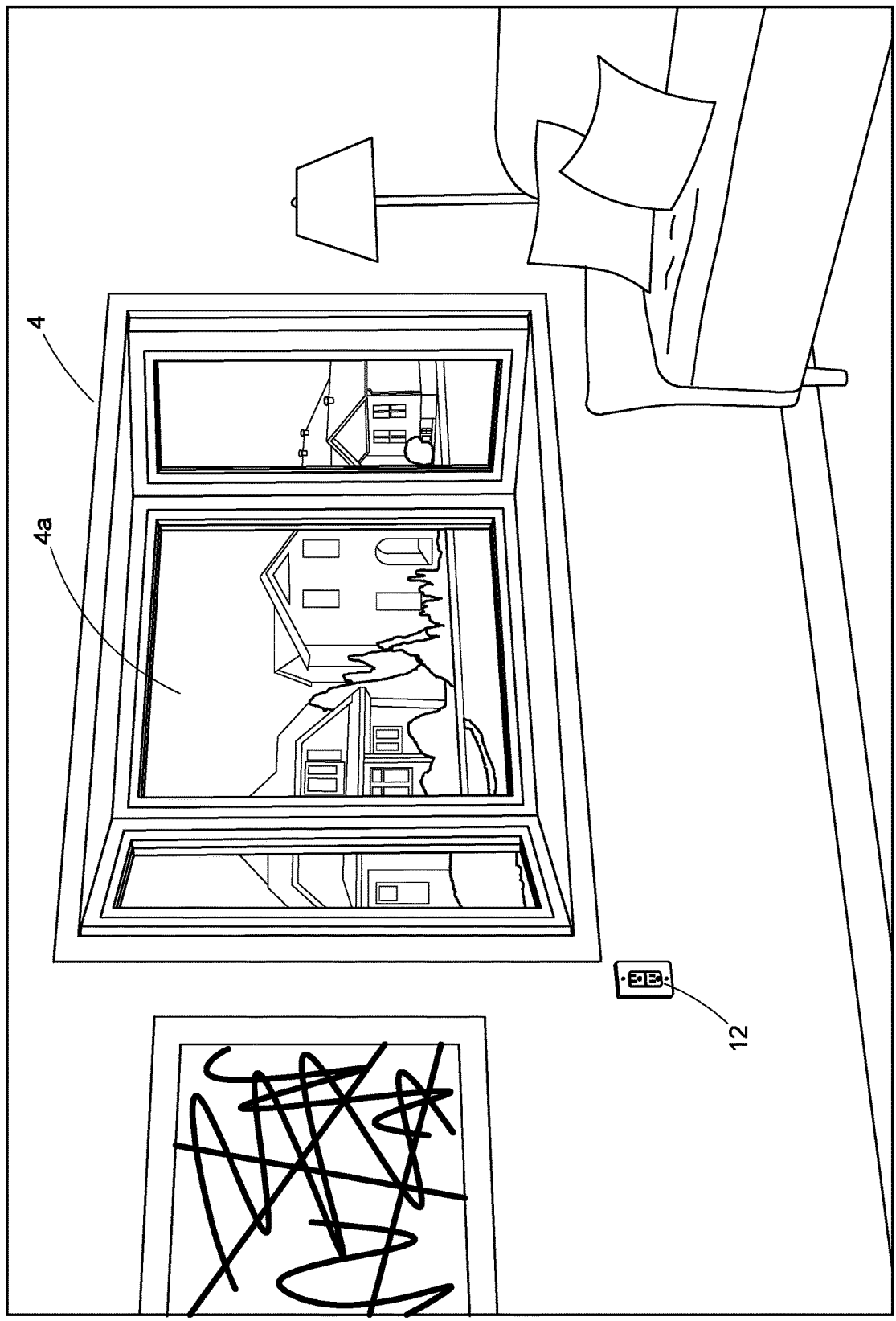

FIG. 3 corresponds to FIG. 2a but is an enlarged view more clearly showing the environment of the living room.

Figure 4A:
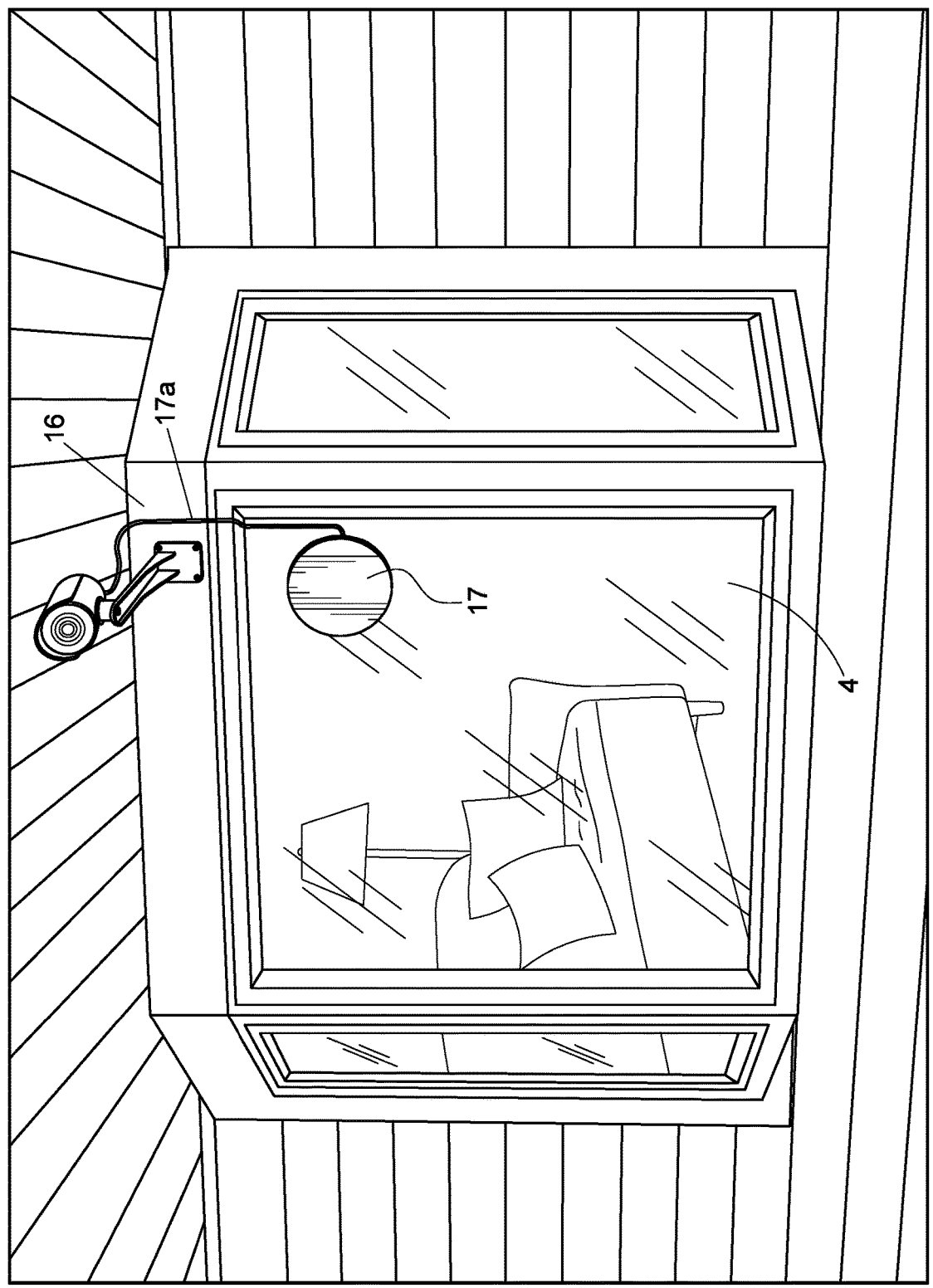
FIG. 4a is a close-up view of the outdoor environment of FIG. 2b and illustrates a first embodiment of a part of an installed power transfer system according to the present invention.
Figure 4B:
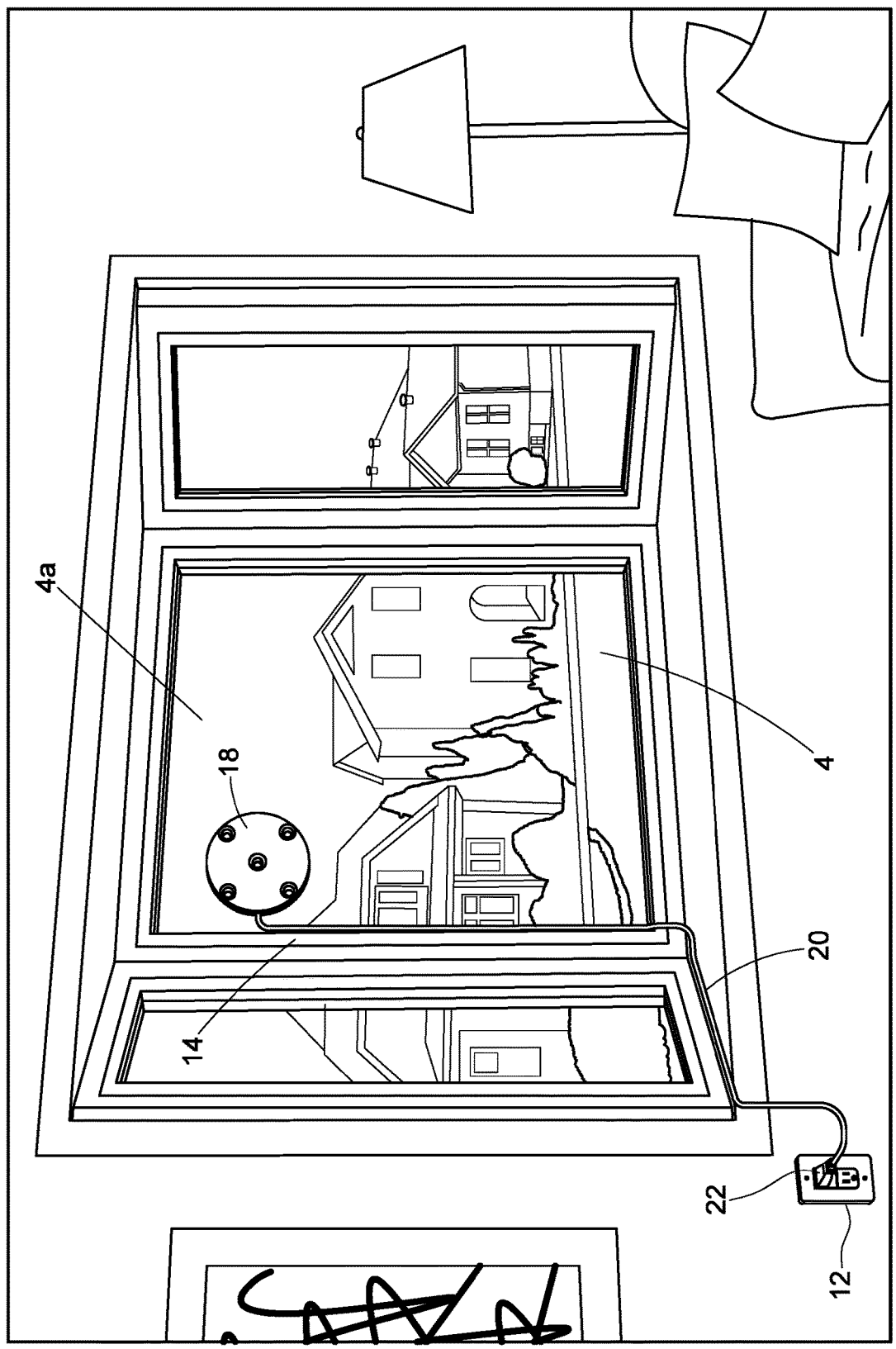

FIG. 4a and FIG. 4b correspond to FIG. 2b and FIG. 2a, respectively, although the dwelling 2 is installed with a first embodiment of a power transfer system according the present invention. The power transfer system has two main parts, namely an emitter unit 14 and a receiver unit 16.

FIG. 4a shows the receiver unit 16 which includes a receiver 17 in the form of a disc structure and an electrical cable 17a for supply electrical power to an appliance which in this illustration is a security camera.

FIG. 4b shows that the living room is installed with an emitter unit 14. In this embodiment, the emitter unit 14 includes an emitter 18 in the form of a disc structure and an electrical cable 20 extending from the disc structure for establishing an electrical connection with the electrical socket 12 via an electrical plug 22. In this embodiment, the emitter unit 14 is provided with a primary wire coil 25 made of copper wire coiled in the disc structure. In this embodiment, the emitter unit 14 is provided with a transformer for stepping down the voltage of the AC from the electrical socket 12 from 110V (or 240V) to 5V-24V. The emitter unit 14 is also provided with a first converter for stepping up the frequency of the AC from the electrical socket 12 from 50 Hz-60 Hz to 50 kHz-300 kHz. The transformer may reside in the electrical plug 22 or may exist as a unit external to the electrical plug 22. The first converter may reside in the disc structure of the emitter 18.

Figure 5A:
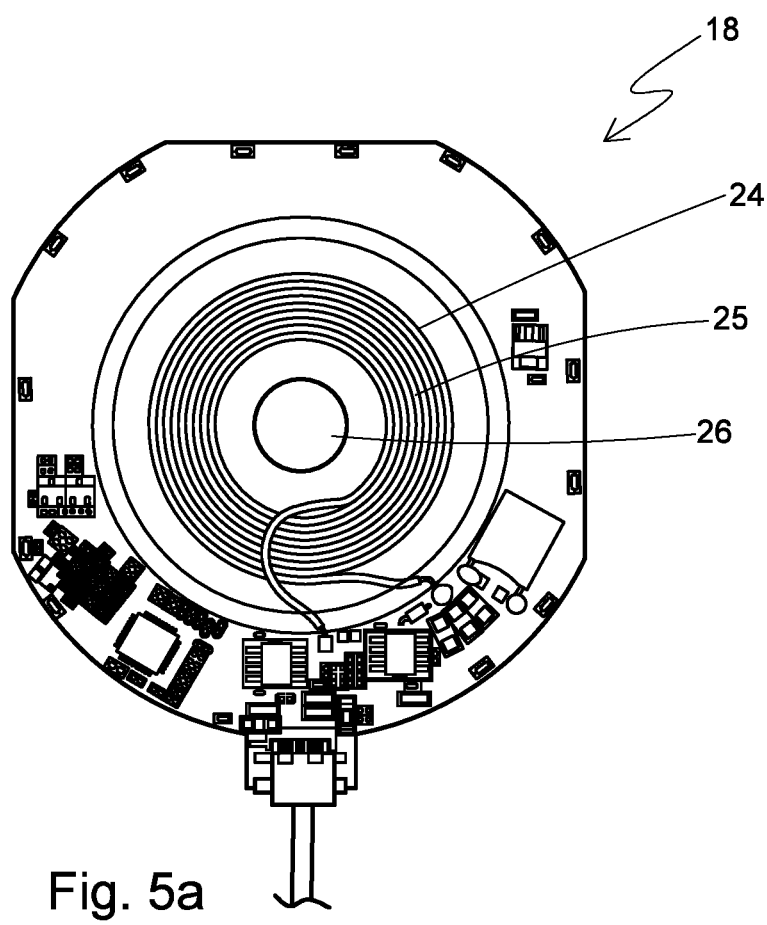
FIG. 5a and FIG. 5b are schematic diagrams showing parts of an emitter unit and a receiver unit of the power transfer system of FIGS. 4a and 4b, respectively.
Figure 6:
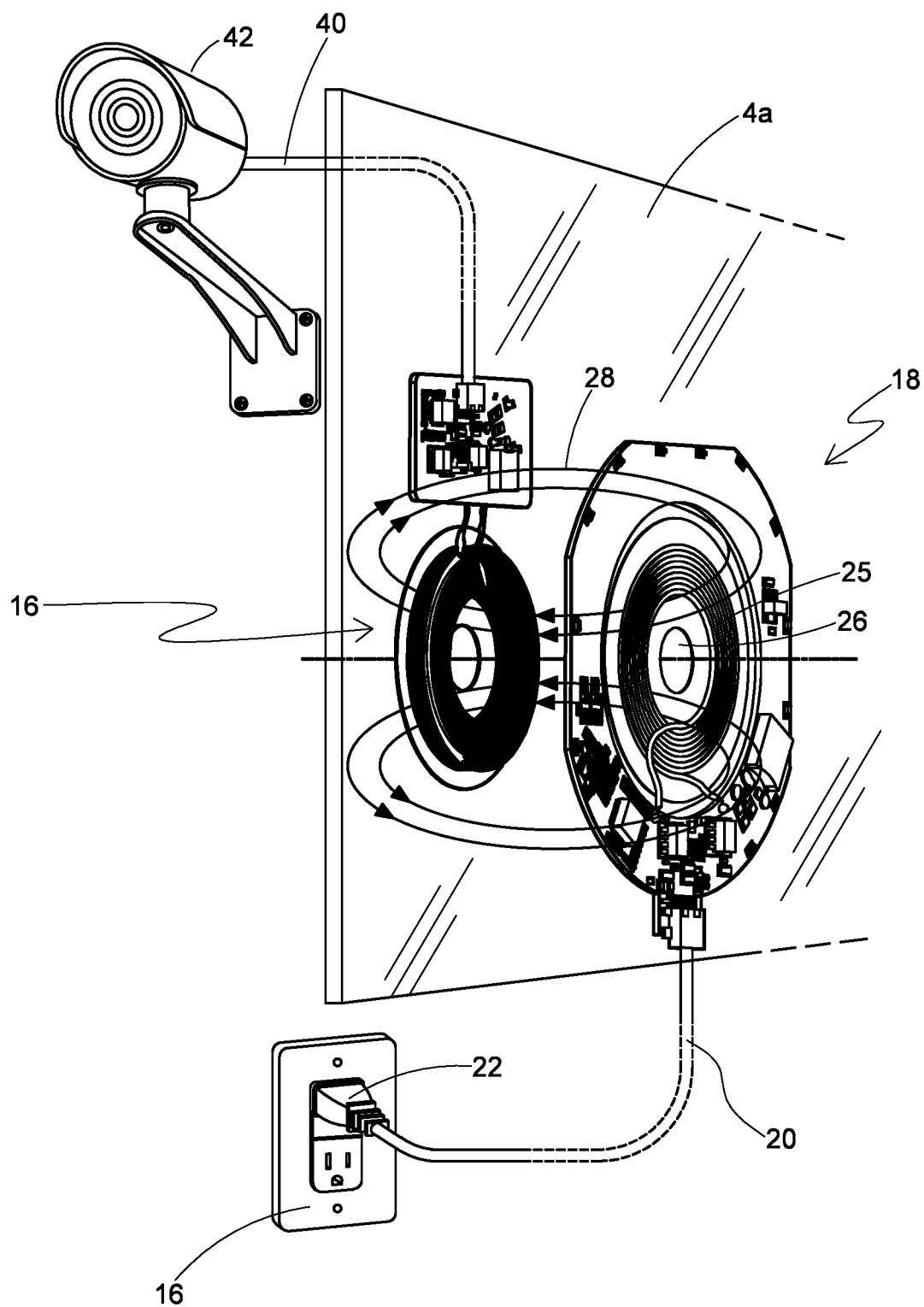
FIG. 6 is a schematic view showing the power transfer system installed at the dwelling of FIG. 1.

FIG. 5a and FIG. 6 illustrate internal structures of the emitter 18. FIG. 5a is a schematic diagram showing the primary coil 25 and a part of the electrical cable 20 downwardly extending from the emitter 18. A housing 30 of the emitter 18 accommodating these components is removed for illustration. The primary wire coil 25 is essentially a long cooper wire formed into loops 25 which define an opening 26 in the center of the loops 25. FIG. 6 schematically shows that when the electrical cable 20 is connected to the electrical socket 16, an alternating current passing through the primary wire coil 24 will generate a magnetic field or flux, as illustrated by looping lines 28. The housing 30 of the emitter 18 likewise has a cutout region 26a, 26b in its center. With the presence of both the opening 26 defined by the loops of the primary wire coil and the cutout region 26a, 26b of the housing 30, there is also provided a see-through aperture in the center of the emitter unit. Please see line A-A'. Please also see FIG. 7.

Figure 5B:
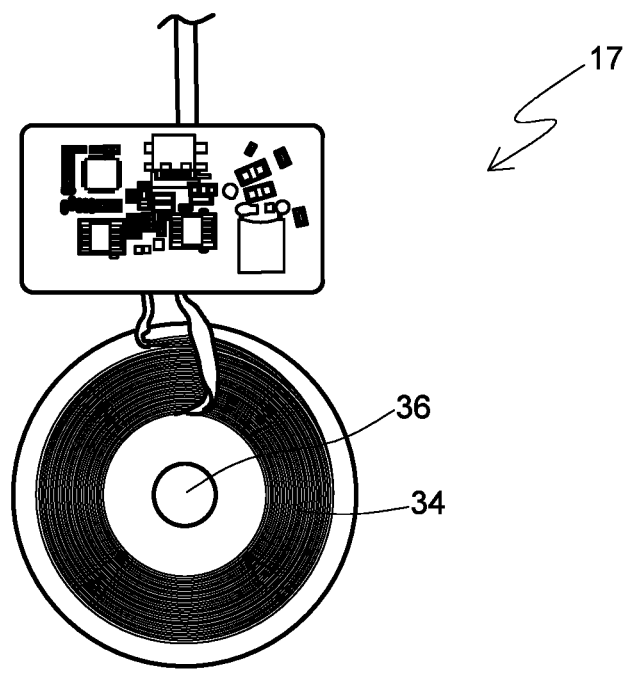

FIG. 5b illustrates internal structures of the receiver 17 of the receiver unit 16. The receiver unit 16 likewise includes the receiver 17 having a housing accommodating a secondary wire coil 34. Similar to the primary wire coil 24 of the emitter 18, the secondary wire coil 34 of the receiver 17 of the receiver unit 16 likewise defines an opening 36. However, unlike the housing 30 of the emitter 18, the housing 32 of the receiver 17 is not provided with any cutout region in its center. Instead, the housing 32 facing the glass panel facing side is provided with a prominent guide 38 in the form of a marking on its center. Since the housing 32 does not have a cutout region, the receiver 17 does not have a see-through aperture in the center, but just the visible marking on the center. Please also see FIG. 7.

The receiver unit 16 is provided with a second converter for converting the AC generated in the secondary wire coil 34 into DC for supply to an electrical appliance. The second converter also acts as a voltage regulator to stabilize the converted DC to a predetermined fixed voltage, e.g. 5V or 9V. This is to protected the connected appliance from overpowered or fired.

The system further includes a controller as a safety feature. Specifically, the controller limits the voltage and the current output from the emitter unit to 24V 1000 mA, respectively, such that the receiver coil would not receive an excessive power and would not generate an excessive voltage or current therefrom.

FIG. 6 schematically shows that when the magnetic field is generated by the primary wire coil 24, the magnetic field will cause a generation of an AC in the secondary wire coil 34. A conversion circuit from the second converter converts the AC voltage to DC voltage. The receiver unit 16 is also provided with an electrical cable 40 for supplying the DC supply from the conversion circuit for use by an appliance. In the context of FIG. 6, the electrical cable 40 extends upwardly from the housing 32 of the receiver 17 and connects to the appliance which in this embodiment is a surveillance camera 42.

With the aforementioned design, it thus can be understood that as an electrical current pulse (AC) passes through the wire of the primary wire coil, a magnetic field is generated. The presence of the adjacent secondary wire coil in the moving magnetic field effects the generation of an AC in the secondary wire coil. Thus, power is transferred from the emitter unit 14 from one side of the window 4 to the receiver unit 16 on the other side of the window 4 across the glass panel 4a. It is to be noted when installing the emitter unit 14 on the indoor (or interior) side of the window 4 and the receiver unit 16 of the outdoor (or exterior) side of the window 4, no hole drilling is needed. Effectively, reliable electrically power is transferred from the electrical socket 12 of the living room to the appliance 42, via the emitter unit 14 and the receiver unit 16.

Figure 7:
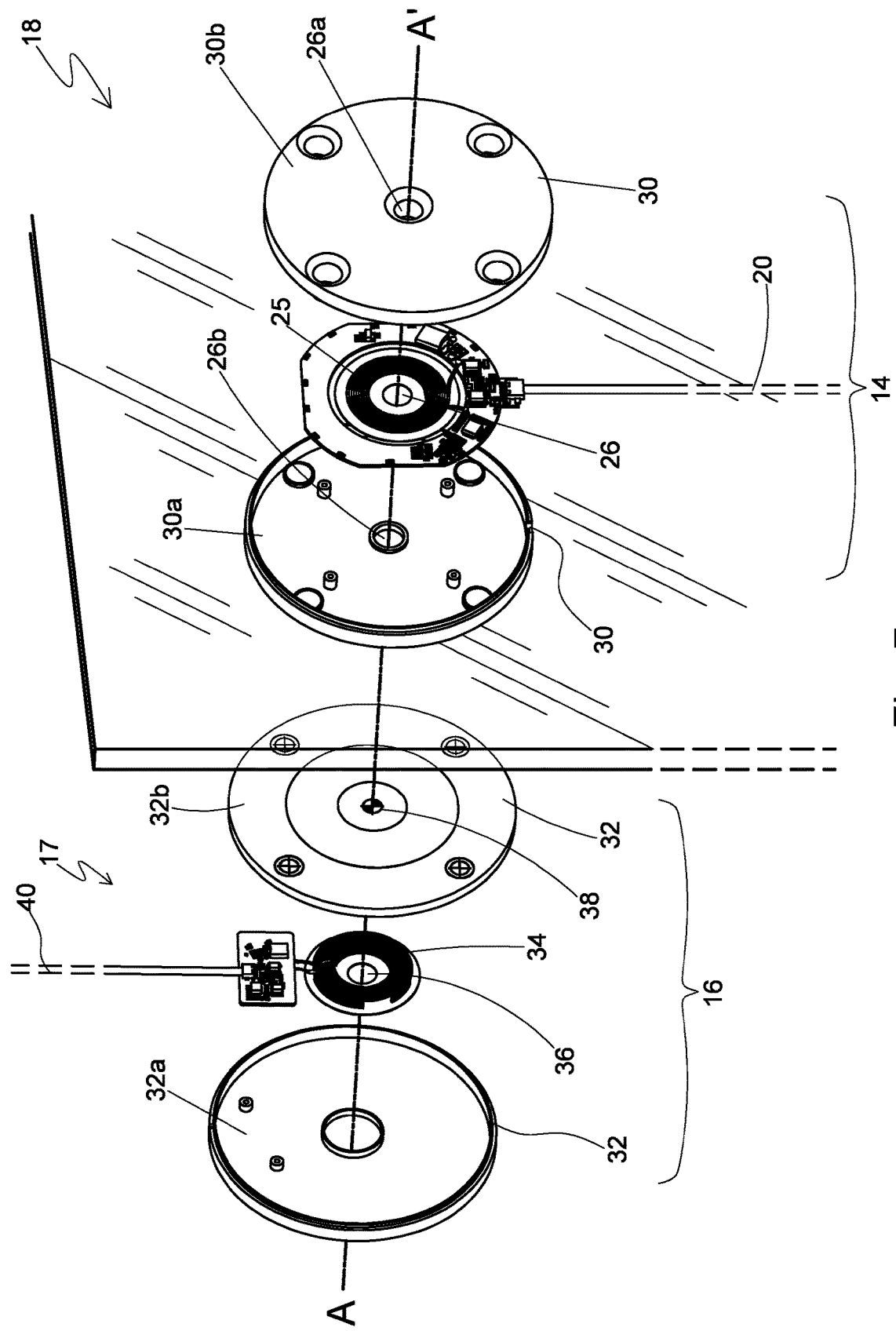
FIG. 7 is an alternative schematic view illustrating the first embodiment of the power transfer system of FIGS. 4a and 4b.
Figure 8:
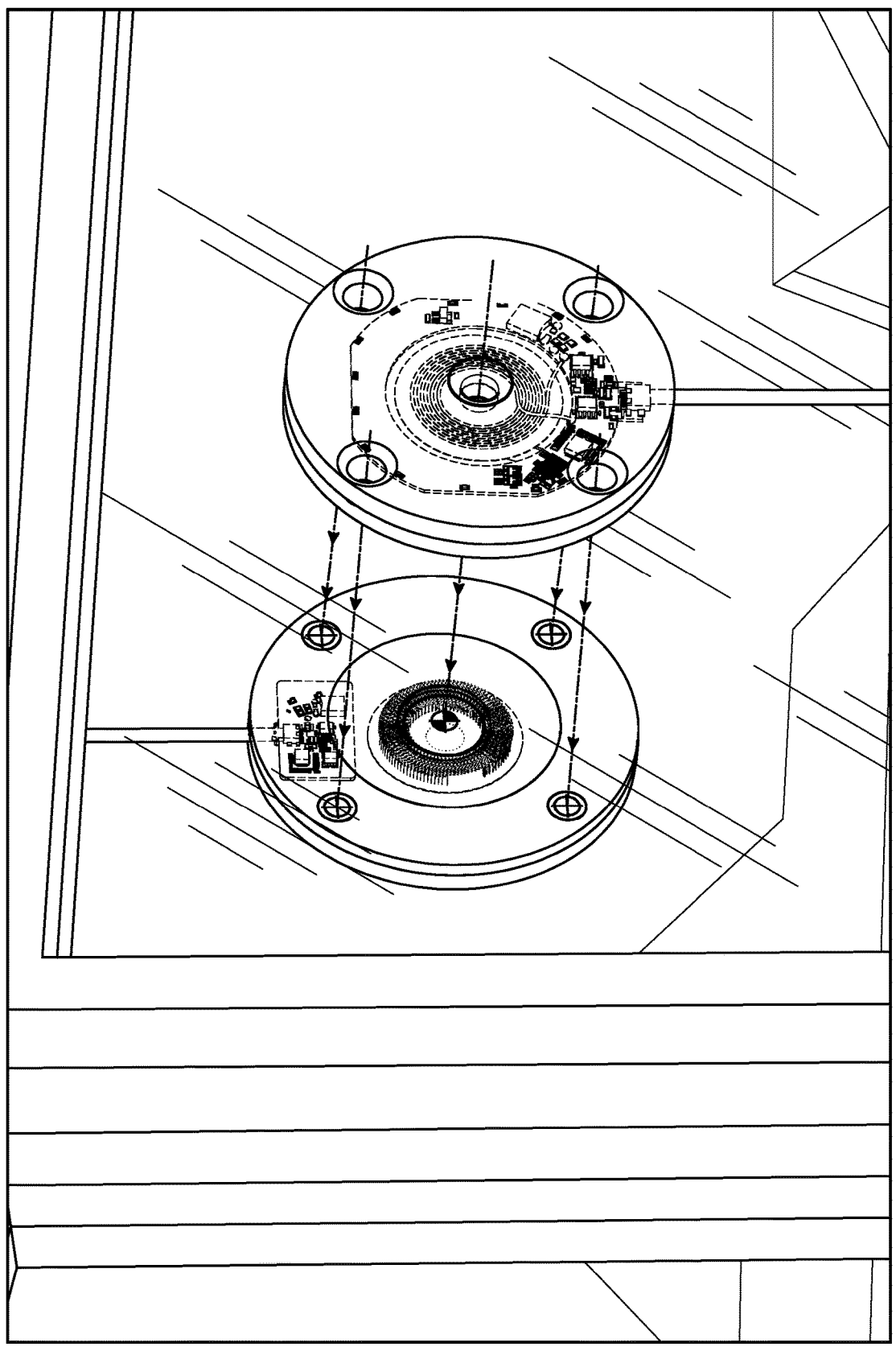
FIG. 8 is another schematic view illustrating an installation of the first embodiment of the power transfer system of FIG. 7.

FIG. 7 illustrates one aspect of the embodiment in a greater detail. The housing 30 of the emitter unit 14 has two hales, namely a back housing member 30a for attachment to the indoor side of the glass panel and a front housing member 30b facing away the glass panel 4a. The front and back housing members 30a, 30b are securable together by screws and they together define a cavity for accommodating the primary wire coil 24 and the other electronics with the electrical cable 20 extending from the emitter 18 out of the housing 30 for connection to an electrical socket 16.

Still referring to FIG. 7, likewise the housing 32 of the receiver unit 16 has two halves, namely a back housing member 32b for attachment to the outdoor side of the glass panel and a front housing member 32a facing away the glass panel. The front and back housing members 32a, 32b are securable together by screws and they together also define a cavity for accommodating the secondary wire coil 34 and the other electronics with the electrical cable 40 extending from the receiver 17 out of the housing 32 for connection to an appliance. As discussed, the glass panel facing side of the housing 32 of the receiver 17 has the prominent marking 38 on its center.

Positioning of the emitter 18 of the emitter unit 14 and the receiver 17 of the receiver unit 16 on opposite sides of the glass panel 4a such that they align is a feature of at least some embodiments of the present invention. The positioning can be considered as system of alignment. It is to be understood that if the emitter 18 and the receiver 17 do not align or do not sufficiently align, the magnetic field generated from the primary wire coil 24 may not be transferred or may not be sufficiently transferred to the secondary wire coil 34 such that a direct current would not be generated or would not be sufficiently generated from the receiver unit. One challenge is that, due the presence of the glass panel, positioning the emitter 18 and the receiver 17 on opposite sides of the glass panel in an aligned manner can be tricky.

FIGS. 8 and FIGS. 9a to 9c are schematic diagrams illustrating another aspect of the first embodiment of the power transfer system of the present invention. Specifically, FIGS. 8 and FIGS. 9a to 9c illustrate the configuration and installation of this embodiment power transfer system. In addition to the housing 30 of the emitter unit 14 having a see-through aperture 26, 26a, 26b in its center and the presence of the prominent marking 38 on the center of the receiver unit, they both share the same circular profile. Further, in this embodiment, they share the same circular dimension. During installation, a user may first secure the receiver 17 on the outdoor side of the glass panel, e.g. at the upper left-hand corner of the main window, such that the prominent marking 38 is visible on the other side via the glass panel. The securement may be achieved by using a double side adhesive tape or a Velcro® tape. After the securement of the receiver 17 at the upper left corner of the glass panel 4a, the user can proceed to the living room and install the emitter 18 on the other side of the glass panel. In order to ensure that the emitter 18 is aligned with the receiver 16, the user is to position the emitter 18 on the indoor side of the glass panel such that the see-through aperture 26, 26a, 26b come into line with the prominent marking 38. Specifically, the user will slide the emitter 18 on the indoor side of the glass panel until the marking 38 of the receiver 17 is visible from the see-through aperture 26, 26a, 26b of the emitter 18. Once the marking 38 is seen at the center of the see-through aperture 26, 26a, 26b, the emitter 18 and the receiver 16 are aligned. As discussed above, both the emitter 18 and the receiver 17 share the same circular profile. It can thus be understood that when the rim of the housing 30 of the emitter 18 matches the rim of the housing 32 of the receiver 17, the emitter 18 and the receiver 17 are aligned. In other words, this embodiment of the power transfer system has two features for positioning and alignment. First, the matching of the see-through aperture 26, 26a, 26b of the emitter 18 to the prominent mark 38 from the receiver 17 is a first indication of the alignment, and the matching of the circular rim of the emitter 18 to the circular rim of the receiver 17 is a second indication of the alignment. Please see FIGS. 9a to 9c in particular. In any event, it can be envisaged that in other embodiments the housing of the receiver unit is alternatively configured with a see-through aperture in its center while the housing of the emitter unit is provided with a prominent marking.

Experiments conducted leading to the present invention indicates that while the present invention is workable as long as the thickness of the barrier or clearance between the emitter and the receiver is not excessive. However, there are preferable parameters in the context of the present invention. Table 1 blows summarizes the results with respect to the thickness/clearance and the current received or generated from the receiver unit.

TABLE 1

| Distance between the emitter unit and the receiver unit (mm) | Electric current @ 5 V (Amp) |
|---|---|
| Single glass panel | |
| 45 | 0.222367079 |
| 40 | 0.28923003 |
| 35 | 0.389656504 |
| 30 | 0.549677255 |
| 25 | 0.825735623 |
| 20 | 1.358767161 |
| 15 | 2.582316241 |
| Ceramic panel | |
| 45 | 0.247299404 |
| 40 | 0.327608059 |
| 35 | 0.450625599 |
| 30 | 0.651114968 |
| 25 | 1.006260503 |
| 20 | 1.714321567 |
| 15 | 3.407182462 |
| Drywall panel | |
| 45 | 0.241373285 |
| 40 | 0.311915192 |
| 35 | 0.417130279 |
| 30 | 0.583444495 |
| 25 | 0.8676788 |
| 20 | 1.410294761 |
| 15 | 2.63798858 |
| Wood panel | |
| 45 | 0.213838301 |
| 40 | 0.279877005 |
| 35 | 0.379731642 |
| 30 | 0.54006727 |
| 25 | 0.819170368 |
| 20 | 1.363986971 |
| 15 | 2.632030164 |
| Acrylic plastic panel | |
| 45 | 0.204467469 |
| 40 | 0.284005678 |
| 35 | 0.412202019 |
| 30 | 0.633687277 |
| 25 | 1.053830947 |
| 20 | 1.963928867 |
| 15 | 4.382013579 |
| Cardboard panel | |
| 45 | 0.192573278 |
| 40 | 0.252369872 |
| 35 | 0.34291121 |
| 30 | 0.488523379 |
| 25 | 0.742468801 |
| 20 | 1.239294959 |
| 15 | 2.398957356 |
| Mere clearance (air spacing) | |
| 45 | 0.26492 |
| 40 | 0.35948 |
| 35 | 0.515 |
| 30 | 0.7874 |

TABLE 1-continued

| Distance between the emitter unit and the receiver unit (mm) | Electric current @ 5 V (Amp) |
|---|---|
| 25 | 1.10834 |
| 20 | 2 |
| 15 | 2 |

Table 1 shows that at a distance or spacing of 40 mm, the current generated at the receiver unit at 5V ranges from 0.25 A to 0.36 A depending on the material of the barrier panel. This current range is sufficient to operate a good range of appliances reliably. When the material of the barrier is a single layer glass panel, the current generated at the receiver unit at 5V ranges from 1.36 A to 0.29 A depending on the thickness of the barrier panel. This current range is also sufficient to operate a good range of appliances reliably.

There are other embodiments of the positioning system for assisting the alignment of the emitter unit and the receiver unit to be explained as follows. Further, experiments were also performed with respect to the use of the panel made from different non-metallic materials.

Figure 10:
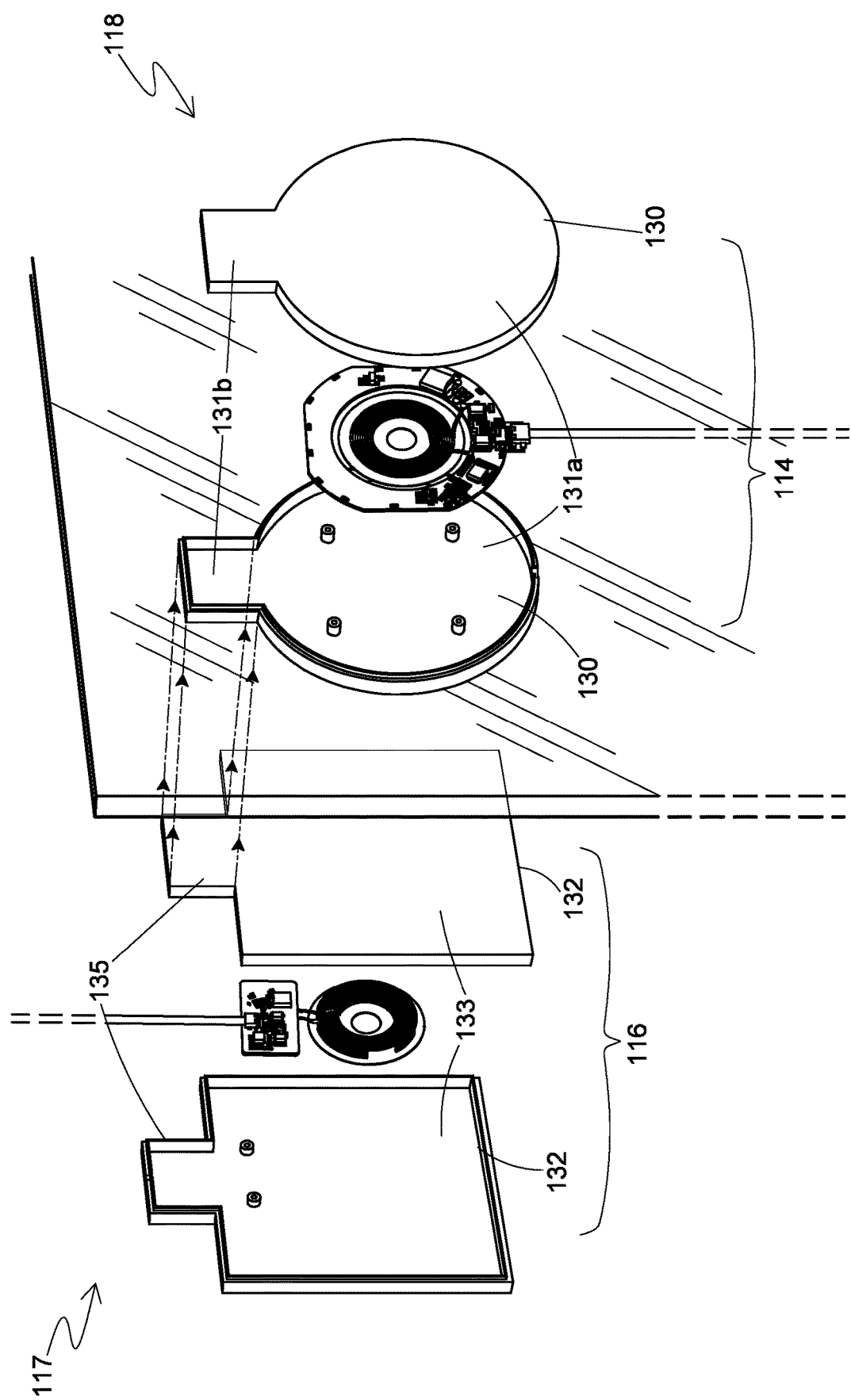
FIG. 10 is a schematic view illustrating a second embodiment of a power transfer system according to the present invention.

FIG. 10 is a schematic view showing an alternative embodiment of a positioning system of a power transfer system according to the present invention. In this embodiment, a receiver unit 116 likewise has a receiver 117 having a housing 132 made of a larger square portion (lower) 133 and a smaller square portion (upper) 135 upwardly projecting from the larger square portion 133. The smaller square portion 135 defines a square like rim acting as a guide or marking. An emitter unit 114 likewise has an emitter 118 having a housing 130 but made of a circular portion 131a and a square portion 131b upwardly projecting from the circular portion 131a. The upper square portion 131b is significantly smaller in size than the lower circular portion 131a. It is however to be noted that both the upper square portion 135 of the receiver 117 and the upper square portion 131b of the emitter 118 share the same square profile. During installation, the receiver 117 may be secured to the outdoor side of a glass panel. A user can then proceed to the other side of the glass panel, and position the emitter 118 by moving emitter 118 such that the rim of the upper square 131b of the emitter 118 matches the rim of the upper square 135 of the receiver 117. In any event, it can be envisaged that in other embodiments the upper portion of the housing of the receiver unit and the upper portion of the housing of the emitter unit may adopt a shape other than a square or a rectangle. As long as the upper portions (or projections) share the same profile, the projection can be used as a marking and thus giving rise to a positioning system.

Figure 11:
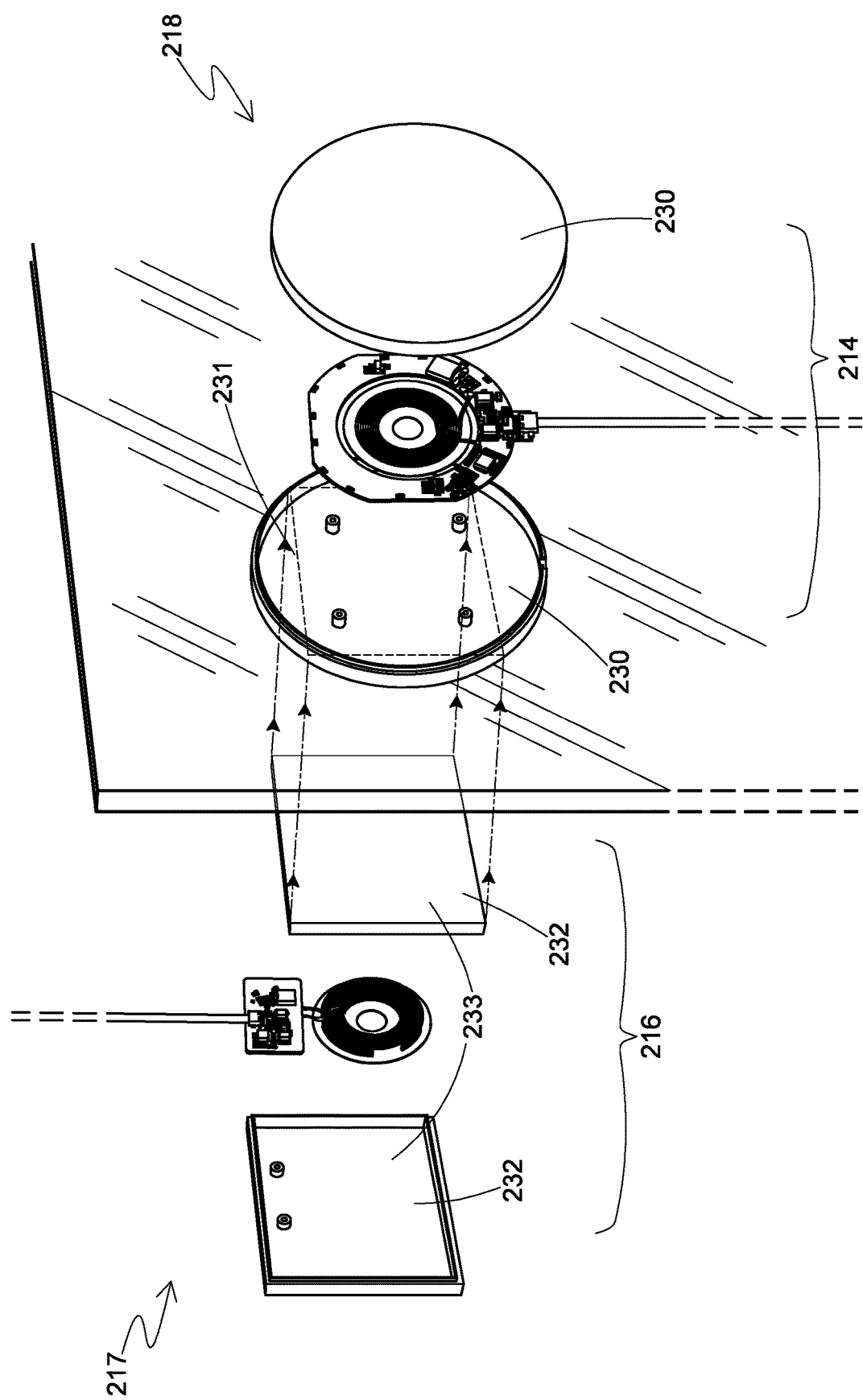
FIG. 11 is a schematic view illustrating a third embodiment of a power transfer system according to the present invention.

FIG. 11 is a schematic view showing an alternative embodiment of a positioning system of a power transfer system according to the present invention. In this embodiment, a receiver unit 216 likewise has an emitter 218 having a housing 232 but it generally has a square profile without any projection. An emitter unit 214 likewise has an emitter 217 having a housing 230 which has a circular profile. The glass panel facing side of the housing 230 of the emitter 218 however is provided with a marking 231 (indicated by the dotted lines defining a square) which share the same square dimension of the housing 232 of the receiver 217. During installation, a user may first secure the emitter 218 to the upper left corner of the glass panel such that the square marking 231 is visible from the opposite side of the glass panel at the front of the house. The user then proceeds to the front of the house and position the receiver 217 on the other side of the glass panel such that the rim of the housing 232 of the receiver 217 matches the marking 232 on the glass panel facing side of the housing 230 of the emitter 218. In any event, it can be envisaged that the emitter 218 may be configured to be square (or rectangular) in shape while the housing of the receiver 217 provides a matching square or rectangular marking. As long as the shape of one of the housings matches the marking on the other housing, they would still make a workable positioning system for alignment purpose.

In an alternative embodiment, the circular housing 230 of the emitter 218 is sized to be just smaller than the housing 232 of the receiver unit 217 such that when the rim of the emitter 218 just touches the rim square housing the emitter 218 and the receiver unit 217 are align. Alternatively, the housing 232 of the receiver unit 217 may be circular and the housing of the emitter 218 may be square and just smaller than the receiver unit 217 such that when the four corners of the square emitter 218 touch the circular rim of the receiver unit 217 the two units are aligned.

Figure 12:
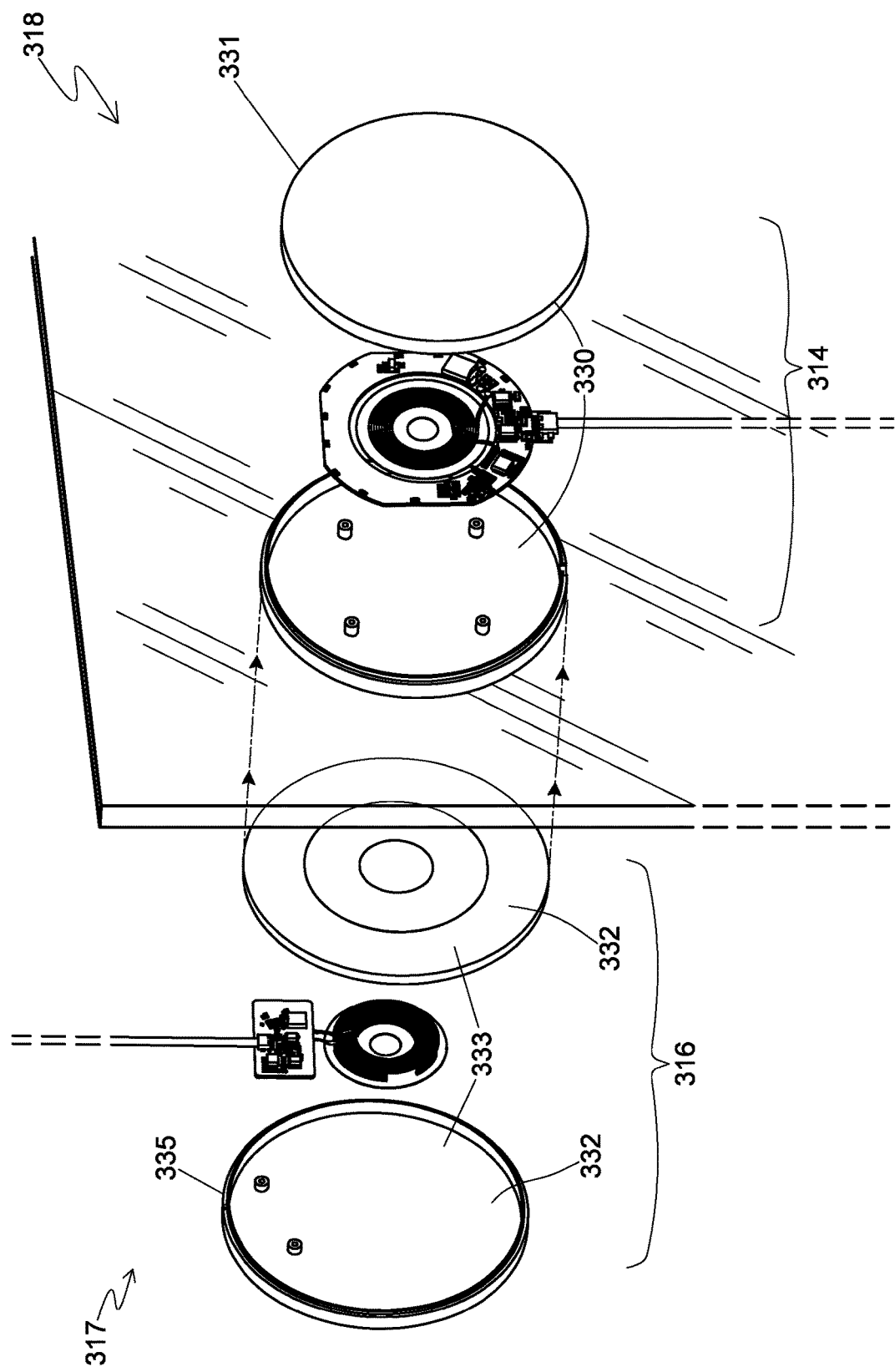
FIG. 12 is a schematic view illustrating a fourth embodiment of a power transfer system according to the present invention.

FIG. 12 is a schematic view showing an alternative embodiment of a positioning system of a power transfer system according to the present invention. In this embodiment, the receiver unit 316 likewise has receiver 317 having a housing 332 with a circular profile without any projection or see-through aperture. The emitter unit 314 likewise has an emitter 318 having a housing 330 with a circular profile with an identical circular dimension. During installation, a user may first secure the receiver 317 to the upper left corner of the outwardly facing side of the glass panel. The user then proceeds to the indoor side of the glass panel and position the emitter 318 such that the rim of the housing 330 of the emitter 318 matches the rim of the housing 332 of the receiver 317. Alternatively, the user may secure the emitter 318 to the glass panel first, and then proceed to secure the receiver 317 to the other side of the glass panel.

Figure 13:
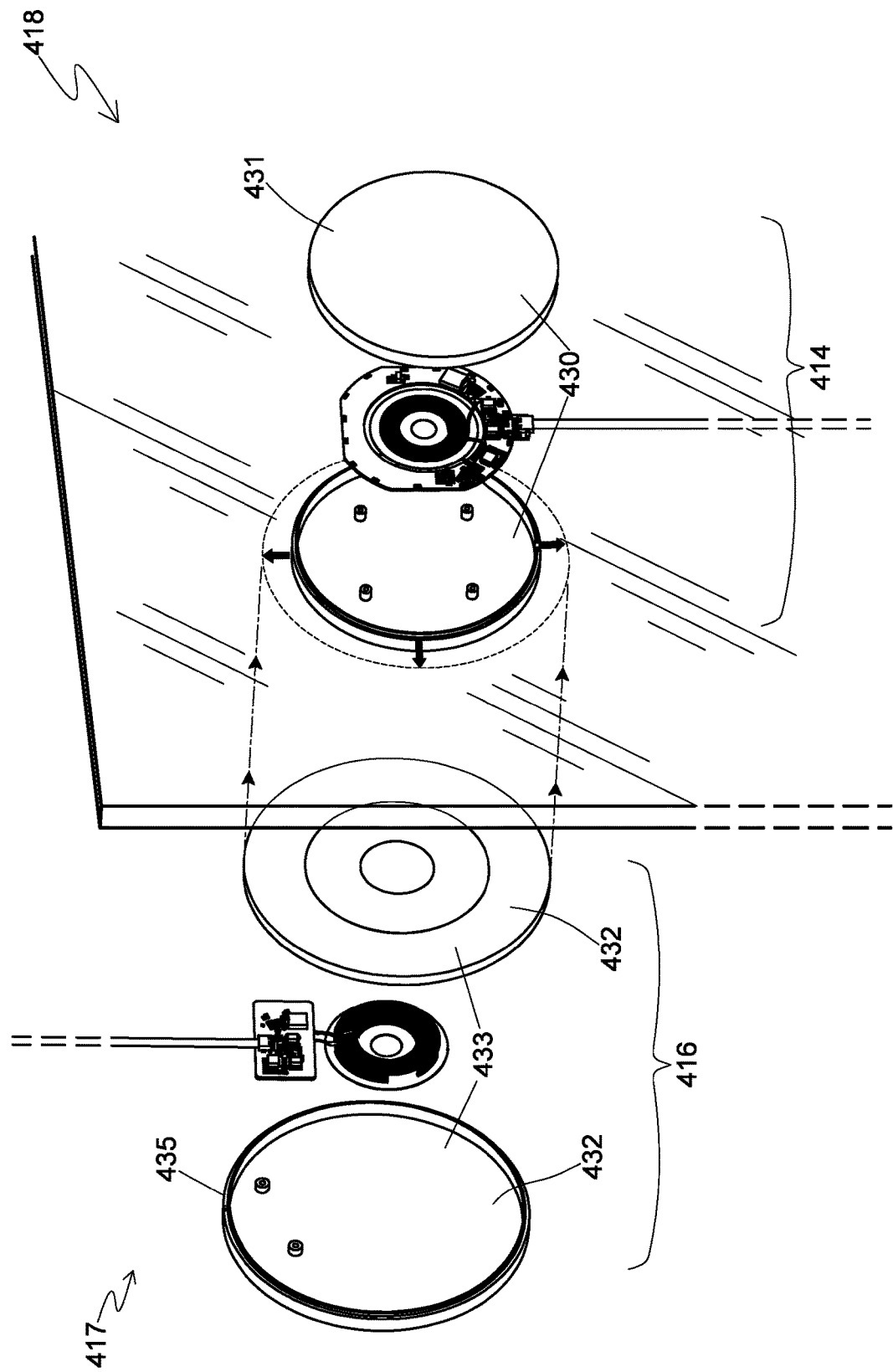
FIG. 13 is a schematic view illustrating a fifth embodiment of a power transfer system according to the present invention.

FIG. 13 is a schematic view showing an alternative embodiment of a positioning system of a power transfer system according to the present invention. In this embodiment, a receiver unit 416 likewise has a receiver 417 having a housing 432 with a circular profile 435 without any projection. The emitter unit 414 likewise has an emitter 418 having a housing 430 also with a circular profile 431 but of a slightly smaller size. During installation, a user may first secure the receiver 417 to the upper left corner of the glass panel. The user then proceeds to the other side of the glass panel and position the emitter 418 such that the rim of the housing 430 of the emitter 418 stays within the rim of the housing 432 of the receiver 417. The positioning system according to this embodiment of the invention is configured such that as long as the emitter 418 stays within the rim of the receiver 417, they would still make a workable positioning system for alignment purpose.

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. Also, a skilled person in the art will be aware of the prior art which is not explained in the above for brevity purpose.

What is claimed is:

1. A system for wireless power transfer from one side of a transparent or translucent panel to the opposite side of the panel, comprising:
an emitter unit installable on the one side of the panel, wherein the emitter unit includes a primary wire coil for receiving an alternating current such that the primary wire coil emanates a magnetic field, and
a receiver unit installable on the opposite side of the panel, wherein the receiver unit includes a secondary wire coil which when subjected to the magnetic field from the primary wire coil generates an alternating current,
wherein:
the emitter unit is provided with a first electrical cable connectable to an electrical outlet at one end thus receiving an alternating current from the electrical outlet,
the receiver unit includes a second converter for converting the alternating current generated from the secondary coil to a direct current for supply to an appliance installable or installed adjacent to the receiver unit, and
wherein:
the system comprises a positioning system provided with a guide on either the emitter unit or the receiver unit and a positioner on the other respective unit whereby when a user is installing the system the user can use the positioner to check a position of the guide across the panel and align the emitter unit and the receiver unit for maximum exposure to the magnetic field by the secondary wire coil.

2. A system as claimed in claim 1, wherein the panel is planar and non-metallic, and/or the panel has a thickness up to 40 mm, preferably up to 30 mm, and more preferably up to 20 mm.

3. A system as claimed in claim 1, comprising a transformer for stepping down a voltage of the alternating current of 110V to 240V incoming from the electrical outlet to 5V to 24V thus producing a voltage stepped-down alternating current for supply to the primary coil, wherein the transformer may reside in the one end of the electrical cable.

4. A system as claimed in claim 3, comprising a first converter for stepping up a frequency of the alternating current of 50 Hz-60 Hz incoming from the electrical outlet to 50 kHz-300 kHz thus producing a frequency stepped-up electrical current for supply to the primary coil.

5. A system as claimed in claim 1, comprising a controller limiting an output voltage and an output current of the emitter unit up to 24V and 1000 mA, respectively, to the primary coil.

6. A system as claimed in claim 5, wherein the controller is configured to allow a two-way communication between the emitter unit and the receiver unit for controlling a predetermined maximum magnetic field output by the primary coil.

7. A system as claimed in claim 1, wherein the guide is a marking on the receiver unit secured to one side of the panel and the positioner is an opening provided on the emitter unit whereby matching the opening to the marking allows alignment of the emitter unit and the receiver unit.

8. A system as claimed in claim 7, wherein the opening is provided at the center on the emitter unit surrounded by the primary wire coil and the marking is provided at the center of the receiver unit surrounded by the secondary wire coil.

9. A system as claimed in claim 1, wherein the guide is a first projection extending from the receiver unit and the positioner is a second projection extending from the emitter unit, and wherein the first protection and the second projection have the same profile whereby matching the first and second projections allows alignment of the emitter unit and the receiver unit.

10. A system as claimed in claim 1, wherein the guide is a marking defining a shape provided on the emitter unit and the positioner is a boundary of the receiver unit defining the same shape.

11. A system as claimed in claim 1, wherein the guide is a boundary of the emitter unit defining a profile and the positioner is a boundary of the receiver defining the same profile.

12. A system as claimed in claim 1, wherein the guide is a boundary of the receiver unit defining a first geometry and the positioner is a boundary of the emitter unit defining a second geometry smaller than the first geometry.

13. An electrical appliance system, comprising a power transfer system as claimed in claim 1 and an electrical appliance, wherein the electrical appliance is selected from a group including an outdoor camera, a security light or an illumination lighting.

14. A system for wireless power transfer from one side of a non-metallic panel to the opposite side of the panel, comprising or wherein:
a transformer for stepping down a voltage of an alternating current of 110V to 240V incoming from an electrical outlet of a premises to 5V to 24V thus producing a voltage stepped-down alternating current,
an emitter unit installable on the one side of the panel, wherein the emitter unit is provided with a first converter for frequency stepping up the voltage of 50 Hz-60 Hz to 50 kHz-300 kHz thus producing a frequency stepped up alternating current,
the emitter unit is provided with a primary coil for receiving the voltage stepped down and the frequency stepped up alternating current of 5V to 24V and 50 kHz to 300 kHz thus generating a magnetic field,
a receiver unit installable on the opposite side of the panel, wherein the receiver unit includes a secondary coil which when subjected to the magnetic field generates an alternating current,
a second converter for converting the alternative current generated in the secondary to a direct current, for supply to an appliance installable or installed adjacent to the receiver unit, and
the emitter unit and the receiver unit, when in use, are separated by the panel having a thickness or a clearance up 40 mm, preferably up to 30 mm, and more preferably up to 20 mm.

15. A system as claimed in claim 14, comprising a controller limiting an output voltage and an output current of the emitter unit up to 24V and 1000 mA, respectively, wherein the controller is configured to allow two-way communication between the emitter unit and the receiver unit for controlling a predetermined maximum magnetic field output by the primary coil, and wherein the receiver unit is configured to output a voltage of up to 24V.

16. A system as claimed in claim 14, wherein:
the system comprises a positioning system provided with a guide on either on the emitter unit or the receiver unit and a positioner on the other respective unit whereby when a user is installing the system the user can use the positioner to check a position of the guide across the panel and locate and align the emitter unit and the receiver unit for maximum exposure to the magnetic field by the receiver unit, the guide is a marking on the receiver unit secured to one side of the panel and the positioner is an opening provided on the emitter unit whereby matching the opening to the marking allows alignment of the emitter unit and the receiver unit, and the opening is provided at the center on the emitter unit surrounded by the primary wire coil and the marking is provided at the center of the receiver unit surrounded by the secondary wire coil.

17. A system as claimed in claim 14, wherein the guide is a first projection extending from the receiver unit and the positioner is a second protection extending from the emitter unit, and wherein the first protection and the second projection have the same profile.

18. A system as claimed in claim 14, wherein the guide is a marking defining a shape provided on the emitter unit and the positioner is a boundary of the receiver unit defining the same shape.

19. A system as claimed in claim 14, wherein the guide is a boundary of the emitter unit defining a profile and the positioner is a boundary of the receiver defining the same profile.

20. A system as claimed in claim 14, wherein the guide is a boundary of the receiver unit defining a first geometry and the positioner is a boundary of the emitter unit defining a second geometry small/than the first geometry.

* * * * *